Patent Number: 4,767,955
Date of Patent: Aug. 30, 1988

United States Patent [19]
McDaniel

[54] LINEAR ACTUATOR MOTOR

[75] Inventor: Michael A. McDaniel, Bend, Oreg.

[73] Assignee: Precise Flight, Inc., Bend, Oreg.

[21] Appl. No.: 81,795

[22] Filed: Aug. 5, 1987

[51] Int. Cl.[4] .............................................. H02K 7/06
[52] U.S. Cl. ........................................ 310/20; 310/80; 335/228
[58] Field of Search ...................... 310/12, 15, 17, 20, 310/21, 22, 31, 32, 33, 80, 83

[56] References Cited

U.S. PATENT DOCUMENTS 3,721,873  3/1973  Vogel ..................................... 310/33
4,228,373 10/1980  Funderburg ........................... 310/20

FOREIGN PATENT DOCUMENTS 550249 12/1942 United Kingdom ................. 310/32

*Primary Examiner*—Mark O. Budd
*Assistant Examiner*—Judson H. Jones
*Attorney, Agent, or Firm*—Chernoff, Vilhauer, McClung & Stenzel

[57] ABSTRACT

A motor includes a pair of linear actuators having a rack connected to their actuation elements. The linear actuators are powered in a manner which causes them to oscillate. A pair of sector gears which mesh with the rack are rotatably mounted on individual shafts to rotate clockwise when the rack moves in one direction and counterclockwise when the rack moves in the opposite direction. One of the sector gears is coupled to its associated shaft through a counterclockwise one-way clutch and the other sector gear is coupled to its shaft through a clockwise one-way clutch. The shafts have intermeshing drive gears mounted on them and thereby rotate counter to one another. An output gear can be coupled to either drive gear through an idler gear which is engaged with the appropriate drive gear by a solenoid-operated carriage. When the rack is moving in a first direction one of the sector gears is coupled to its shaft through its one-way clutch to rotate the drive gears. When the rack is moved in the opposite direction the other sector gear is coupled to its shaft through its one-way clutch to rotate drive the drive gears. Since the drive gears counterrotate and each is driven only when its associated sector gear is rotated in the proper direction, the drive gears continue to rotate in the same direction when the rack oscillates. Typically, a motor comprises several stages each having a pair of linear actuators, sector gears and a rack.

13 Claims, 1 Drawing Sheet

LINEAR ACTUATOR MOTOR

BACKGROUND AND SUMMARY OF THE INVENTION

This invention relates to a motor which provides continuous rotary output from the oscillating movement of linear actuators.

There are many applications for lightweight, low speed, high torque motors which can be reversed or locked up almost instantaneously. One such application is in the activation of flaps, speedbrakes and other control surfaces on aircraft. While hydraulic actuators work well in these applications they are costly and heavy, both of which are extremely undesirable in aircraft, particularly in general aviation aircraft. In addition, hydraulic actuators require the use of extensive hydraulic lines which create maintenance problems and are subject to failure. Thus, electric motors are preferable for this purpose in general aviation aircraft.

However, heretofore electric motors have had several shortcomings when used for actuating aircraft control surfaces. While electric motors themselves are lightweight, they generally are high speed and must be geared down to obtain the torque necessary to overcome the aerodynamic forces they encounter in this application. The resulting gear boxes are heavy, and, in addition, have a considerable amount of inertia. Thus, it is difficult to stop or reverse them quickly. In addition, the gears used in reduction gear boxes are susceptible to breakage if the device becomes jammed.

The present invention overcomes the foregoing shortcomings of the prior art electric motors by providing a lightweight electric motor which is capable of low speed, high torque operation without the necessity of substantial gearing. This is accomplished by placing a pair of linear actuators with their actuation elements facing one another in axial alignment. The actuation elements of the actuators are connected to opposite ends of a rack gear. Thus, if the actuators are alternately activated, to pull their actuation elements towards them, the rack gear oscillates back and forth. A pair of sector gears, which are rotatably mounted on shafts having axes which are normal to the axis of the rack gear, engage the rack gear and rotate back and forth as the rack gear oscillates.

Each of the sector gears is coupled to its respective shaft through a one-way clutch, however, one of the clutches engages only to transmit clockwise rotation and the other engages only to transmit counterclockwise rotation. Each of the shafts also has a drive gear mounted on it and the two drive gears mesh together. As a result the two drive gears must rotate counter to one another.

An idler gear, which is mounted on a solenoidactuated carrier, can be positioned to engage either one of the drive gears. The idler gear also engages an output gear which serves to transfer the output of the motor to the device being powered by it.

When the rack gear is moving in the direction which causes the sector gears to rotate counterclockwise the first sector gear, which is coupled to its associated first shaft through the counterclockwise engaging clutch, causes the first shaft, and thus the first drive gear, to rotate in a counterclockwise direction. Since the two drive gears intermesh this causes the second drive gear to rotate in the opposite or clockwise direction. This is possible because the counterclockwise rotation of the second sector gear is not being transferred to the second shaft by its one-way clutch. When the direction of the rack gear is reversed the sector gears are rotated in a clockwise direction. The second sector gear now is coupled to the second shaft through the clockwise engaging second one-way clutch, and thus the second drive gear continues to rotate in a clockwise direction. The clockwise rotation of the second drive gear then keeps the first drive gear rotating in the same counterclockwise direction. As a result, as long as the idler gear remains engaged with the same drive gear the output gear rotates continuously in the same direction when the rack gear oscillates.

However, the direction of the motor can be reversed simply and quickly by moving the idler gear out of engagement with one drive gear and into engagement with the other drive gear. Since reversal is accomplished without interrupting operation of the motor, there is little momentum to overcome and reversal can be accomplished quickly without creating stress on the motor parts. Likewise, the motor can be stopped almost instantaneously without creating any stress greater than that which occurs during continuous operation merely by discontinuing to alternate power between the two linear actuators and instead apply it constantly to one of them.

The oscillatory movement of the rack gear is obtained through a transistor switching circuit of the type which is well known in the prior art. In addition to alternately switching power back and forth between the two linear actuators, the switching circuit is capable of varying the frequency at which this occurs. Thus, it is possible to vary the speed of the motor. While changing the frequency of rack gear oscillation only changes the speed of the motor when there is a pause at each end of rack gear travel, the motor can easily be configured to operate in this manner. When a motor is intended to be operated as a variable speed motor it is desirable that it comprise several stages all having their sector gears, one-way clutches and drive gears mounted on common shafts. In multiple stage motors of this type the position of the rack gear in each stage is offset from the position of the rack gear in every other stage. This causes the drive wheels to rotate continuously even though there is a pause when each individual rack gear changes direction.

Since electric linear actuators achieve their greatest force when they are almost fully retracted, the motor of the present invention has limit switches located between the actuators which are contacted by the rack gear as it travels. The limit switches are used to selectively control the distance the rack gear travels before its direction is reversed. Thus, the length the rack gear stroke can be varied. With low frequency oscillation of the rack gear, its stroke will necessarily be quite long in order to prevent large pauses at the end of each stroke. However, as the frequency of the oscillation is increased the stroke of the rack gear will be shortened in order that the actuator be operated more closely in the range where it has maximum power. Thus, frequency of oscillation and length of rack gear stroke normally are changed together in order to obtain the best combination for achieving maximum power at the desired speed. Even though the length of the rack gear stroke can be varied to achieve maximum power, the device by its very nature always operates near the end of the actuation element stroke where a high level of power is obtained from the actuators.

Accordingly, it is a principal object of the present invention to provide an electric motor which is lightweight, operates at a low speed, and has a high torque output.

It is a further object of the present invention to provide such a motor in which continuous rotary output is obtained from linear actuators.

It is a still further object of the present invention to provide such a motor which can have its direction reversed quickly without creating stress on its components that is in excess of what occurs in normal operation.

It is a yet further object of the present invention to provide such a motor which can be locked up quickly without creating stress on its components that is in excess of what occurs in normal operation.

The foregoing and other objectives, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
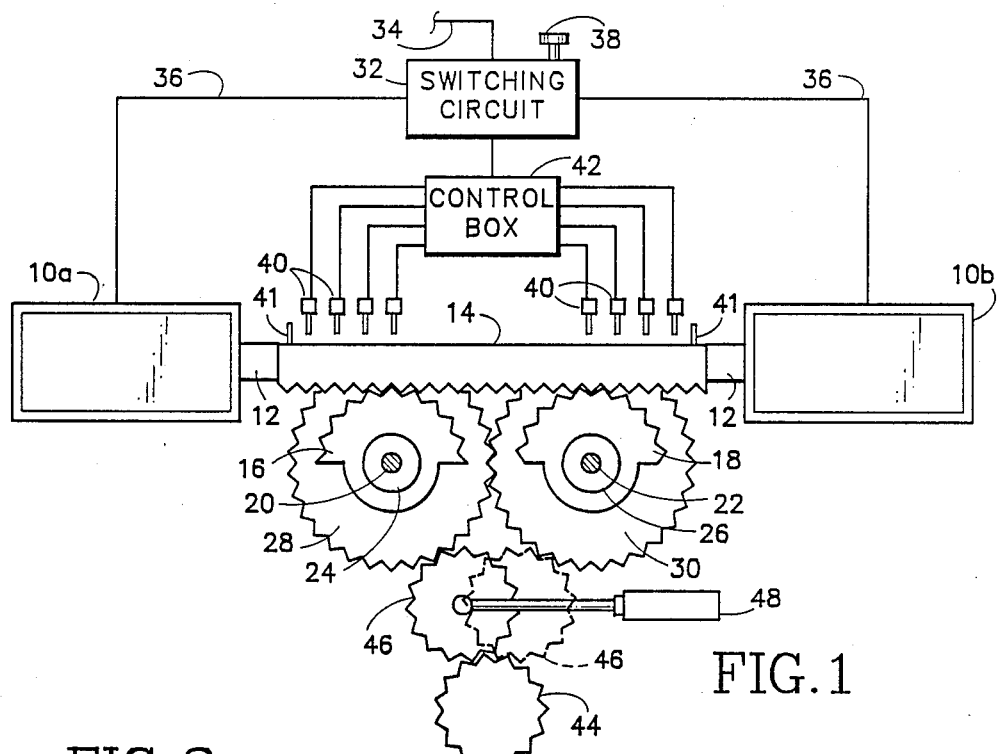
FIG. 1 is a schematic side elevation view of a motor embodying the features of the present invention.
Figure 2:
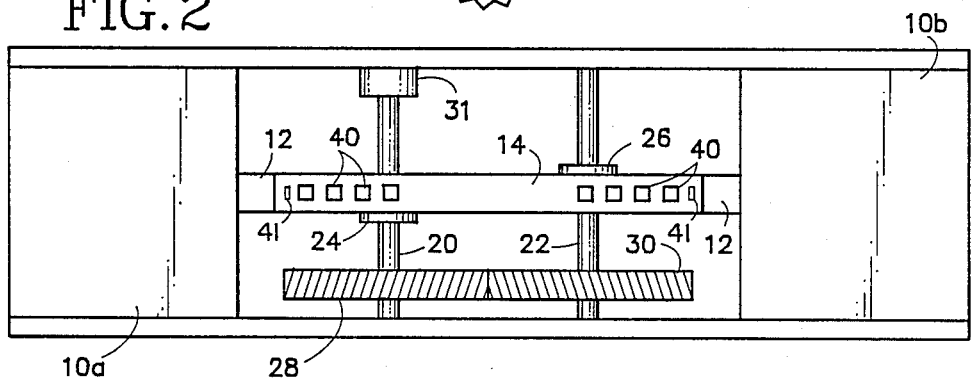
FIG. 2 is a schematic plan view of the motor of FIG. 1.

Referring to the drawings, the motor of the present invention is powered by linear actuators 10. While a single actuator would suffice it would have to be a double-acting actuator. Since single-acting actuators are less expensive than double-acting ones, the preferred embodiment of the motor illustrated in the drawings comprises a pair of single-acting actuators. While the actuators shown and described are electrically powered, hydraulic or pneumatic actuators also would suffice. They would not, however, provide the response available with electric actuators and thus are not as desirable in most applications.

The linear actuators 10 are arranged such that their actuation elements 12 face one another and are connected together through an elongate rack gear 14. The rack gear 14 engages a first sector gear 16 which is offset from the center of the rack toward a first linear actuator 10a, and a second sector gear 18 which is offset from the center of the rack gear towards a second linear actuator 10b. The first sector gear 16 is rotatably journaled on a first shaft 20, and the second sector gear 18 is journaled on a second shaft 22, with the shafts 20 and 22 being parallel to one another and normal to the longitudinal center line of the rack gear. Thus, when the rack gear is moved toward the first linear actuator 10a the rack gear causes both of the sector gears to rotate counterclockwise on their respective shafts and when the rack gear is moved toward the second linear actuator 10b the rack gear causes both of the sector gears to rotate clockwise on their respective shafts. The sector gears are not allowed to rotate freely on their shafts, however. The first sector gear 16 is connected to the first shaft 20 through a first one-way clutch 24, and the second sector gear 18 is connected to the second shaft 22 through a second one-way clutch 26. The first one-way clutch is configured to engage the first shaft 20 upon counterclockwise rotation of the first sector gear 16 and the second one-way clutch is configured to engage the second shaft 22 upon clockwise rotation of the second sector gear. Mounted on the first and second shafts are a first drive gear 28 and a second drive gear 30, respectively. The drive gears directly mesh with one another which necessarily requires that they and their associated shafts rotate counter to one another.

The result of the two sector gears being coupled to their respective shafts by oppositely engaging one-way clutches, and the shafts being coupled together through intermeshing drive gears which forces them to rotate counter to one another, is that the drive gears rotate continuously in one direction when the rack gear is oscillated back and forth. When the rack gear 14 is moving toward the first linear actuator 10a it causes the sector gears 16 and 18 to rotate counterclockwise. Since the first one-way clutch 24 couples the first sector gear 16 to the first shaft 20, the first shaft 20 rotates counterclockwise also. The second one-way clutch 26 does not couple the second sector gear 18 with the second shaft 22 when it is rotating counterclockwise, thereby permitting the second sector gear to rotate freely on the second shaft. The first drive gear 28, which is attached to the first shaft and thus rotates with it, rotates counterclockwise and as a result causes the second drive gear 30, and the second shaft 22, to rotate clockwise.

When the rack gear 14 changes direction and moves towards the second linear actuator 10b it causes both of the sector gears 16 and 18 to rotate clockwise. When this occurs the first one-way clutch does not couple the first sector gear 16 to the first shaft 20 and it rotates freely on it. However, the second one-way clutch now couples the second sector gear 18 to the second shaft 22 and thus causes the second shaft, and the second drive gear 30, to continue to rotate clockwise. Because the second drive gear drives the first drive gear in the opposite direction, the first drive gear continues to rotate in a counterclockwise direction.

While the aforedescribed mechanism in theory converts the oscillatory motion caused by the linear actuators to continuous rotary motion of the drive gears, in practice this is not always the case because the one-way clutches 24 and 26 do not release instantaneously. While at low frequency oscillation rates this does not create a significant problem, at high frequency oscillation rates a significant amount of output can be lost, and the drive gears can even start to oscillate themselves. To correct this problem a third one-way clutch 31 is connected between one of the shafts 20 and 22 and the motor case. The third one-way clutch is reversed from the first or second one-way clutch which is located on that shaft and thus it prevents the shaft from rotating in a direction which is counter to the direction it is supposed to rotate. As a result the third one-way clutch ensures that the first and second one-way clutches release instantaneously and that all of the rack gear movement is converted to drive gear rotation.

With the paired electric linear actuators shown the oscillatory rack gear motion is achieved through a transistor switching circuit 32 which directs power from an output line 34 alternately to power lines 36 running to the two actuators. The details of the switching circuit 32 are not shown since circuits of this type are well known in the prior art and vary widely. There are two common features that the switching circuit should have in order to operate effectively in this application. First, it should include means for varying the frequency of oscillation, which is controlled by an external dial 38. In addition, its output should be ramped slightly to prevent voltage spikes at the initiation and conclusion of current flow on each cycle in order to prevent overheating of the linear actuators.

As well as being able to control the frequency of oscillation, limit switches 40 positioned along the rack gear are contacted by prongs 41 located on the rack gear in order to enable varying the distance the rack gear travels on each stroke. The limit switches are part of well-known circuitry, which is shown as a generalized control box 42, which allows the distance the rack gear travels before being reversed to be varied.

While oscillation frequency and stroke length effect the speed at which the motor operates it is desirable to be able to vary them independently. This is because electric actuators generate more power the further their actuation elements are withdrawn. With low frequency oscillation it is necessary to have a fairly long stroke in order to minimize dead spots at each end of the rack gear travel. However, as motor speed is increased by increasing the frequency of oscillation, the stroke is shortened to increase power. Thus, for any given motor speed there is a particular combination of frequency and stroke length which provides maximum power.

Figure 3:
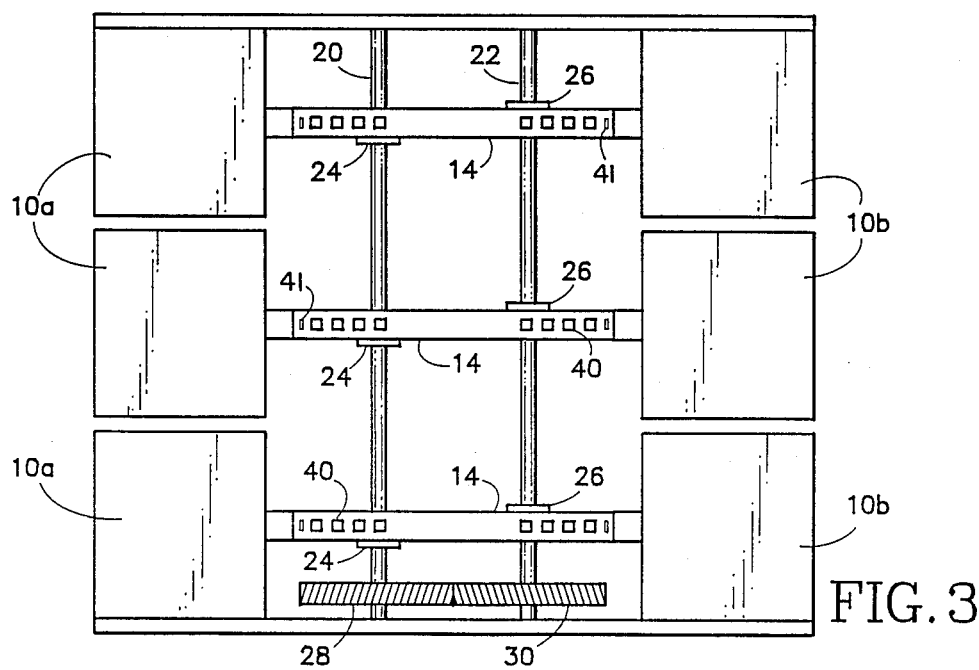
FIG. 3 is a schematic plan view of another embodiment of the invention.

The speed of the motor can be increased by increasing the oscillatory frequency or by increasing the stroke length only up to the point where there no longer is a pause at the end of each stroke. However, having pauses at the end of each stroke clearly is undesirable with the single pair of actuators shown since it will cause discontinuous output. As a result, the motors of the subject invention normally combine several pairs of actuators all of which utilize the same pair of shafts 20 and 22 as shown in FIG. 3. Thus, by staggering the stroke of each of the rack gears relative to that of every other rack gear, pauses at the end of the rack gear strokes will be staggered also and thus will not cause discontinuity in rotation. As a result, it is possible to oscillate each pair of actuators in a range where speed variation is possible and thereby provide a variable speed motor.

While it would be possible to use one of the shafts 20 or 22 as the output of the motor, it is preferable to provide a separate output gear 44 which is coupled to one of the drive gears 28 or 30. Rather than coupling the output gear directly to one of the drive gears, an idler gear 46 is interposed between them. The idler gear is journaled on the piston of a two-position solenoid 48 which moves it into contact with one of the drive gears or the other. Thus, the rotational direction of the output gear 44 can be changed almost instantaneously by moving the idler gear 46 from contact with one of the drive gears into contact with the other drive gear.

In addition to being capable of being reversed quickly, the motor of the subject invention can be locked up instantaneously without creating any greater loading than occurs during normal operation. This is accomplished merely by discontinuing the operation of the switching circuit 32 and applying power continuously to the linear actuator which is closest to having its actuation element completely retracted. Once the actuation element does become completely retracted then the motor becomes locked against further rotation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A rotary drive motor comprising:
   (a) at least one linear actuator having an actuation element which is movable between extended and retracted positions;
   (b) a first shaft;
   (c) means for causing said first shaft to rotate in a counterclockwise direction when said actuation element is moving in a first direction;
   (d) a second shaft;
   (e) means for causing said second shaft to rotate in a clockwise direction when said actuation element is moving in the opposite direction;
   (f) means for operatively coupling said first and second shafts together in a manner such that they always rotate counter to one another; and
   (g) means for coupling one of said first and second shafts to an output shaft.

2. The motor of claim 1, including means for moving said actuation element between its extended and retracted positions in an oscillatory fashion.

3. The motor of claim 1 wherein said actuation element comprises a rack gear and said means for causing said first shaft to rotate comprises:
   (a) a first sector gear which is journaled on said first shaft and which engages said rack; and
   (b) a first one-way clutch which couples said first sector gear to said first shaft when said first sector gear is rotated in a counterclockwise direction and permits said first sector gear to slip on said first shaft when said first sector gear is rotated in a clockwise direction.

4. The motor of claim 3 wherein said means for causing said second shaft to rotate comprises:
   (a) a second sector gear which is journaled on said second shaft and which engages said rack; and
   (b) a second one-way clutch which couples said second sector gear to said second shaft when said second sector gear is rotated in a clockwise direction and permits said second sector gear to slip on said second shaft when said second sector gear is rotated in a counterclockwise direction.

5. The motor of claim 4 wherein said means for operatively coupling said first and second shafts together comprises a first drive gear which is mounted on said first shaft and a second drive gear which is mounted on said second shaft, said first and second drive gears being in intermeshing contact with one another.

6. The motor of claim 5 wherein said means for coupling one of said first and second shafts to an output shaft comprises an output gear which is driven by one of said drive gears.

7. The motor of claim 6 wherein said means for coupling further comprises means for selectively coupling said output gear to a particular one of said drive gears.

8. The motor of claim 6 wherein said means for selectively coupling comprises:
   (a) an idler gear which operably fits between said output gear and said drive gear; and
   (b) actuation means for moving said idler gear between said first and second drive gears.

9. The motor of claim 2 wherein there are two of said linear actuators and they have a common actuation element.

10. The motor of claim 1, including means for preventing said first shaft from rotating in a clockwise direction.

11. The motor of claim 2, including means for controlling the distance the actuation element travels between its extended and retracted positions.

12. The motor of claim 2, including means for controlling the frequency at which the actuation element oscillates.

13. The motor of claim 9 wherein several of said motors are mounted on common first and second shafts and said means for moving said actuation elements includes means for offsetting the position of the rack gear of each motor from the position of the rack gear of every other motor.

* * * * *